United States Patent [19]

Sugino et al.

[11] Patent Number: 5,535,496
[45] Date of Patent: Jul. 16, 1996

[54] MACHINE TOOL WITH PARTS

[75] Inventors: Shigeru Sugino, Mitaka; Masanori Nakagawa, Toyama, both of Japan

[73] Assignee: Sugino Corporation, Schaumburg, Ill.

[21] Appl. No.: 201,889

[22] Filed: Feb. 25, 1994

[51] Int. Cl.[6] .................................................. B23P 23/00
[52] U.S. Cl. ...................... 29/39; 408/35; 408/56; 409/136; 451/67; 483/19
[58] Field of Search ............................. 483/31, 19; 29/40, 29/39, 26 R, DIG. 87, DIG. 88, DIG. 93, DIG. 63, DIG. 36, DIG. 39, DIG. 70; 408/59, 61, 35, 56; 409/134, 135, 136, 140; 451/75, 67; 134/66, 144, 172; 204/129.5, 129.6; 184/6, 14; 239/289

[56] References Cited

U.S. PATENT DOCUMENTS

| | | | |
|---|---|---|---|
| 3,617,141 | 11/1971 | Sullivan | 408/35 |
| 3,928,154 | 12/1975 | Andrews | 204/129.5 |
| 4,164,879 | 8/1979 | Martin | 408/59 |
| 4,182,205 | 1/1980 | Baker | 29/26 R X |
| 4,598,617 | 7/1986 | Kubo et al. | 408/59 |
| 4,648,759 | 3/1987 | Ebenhoch | 408/59 |
| 4,893,642 | 1/1990 | Parslow et al. | 134/66 |
| 5,017,084 | 5/1991 | Lemelson | 483/1 |
| 5,297,657 | 3/1994 | McConkey | 408/61 |

FOREIGN PATENT DOCUMENTS

| | | |
|---|---|---|
| 527238 | 2/1993 | European Pat. Off. ............ 29/40 |
| 3216566 | 11/1983 | Germany . |
| 3943462 | 11/1990 | Germany . |
| 4015412 | 6/1991 | Germany . |
| 4113633 | 10/1992 | Germany . |
| 499827 | 3/1974 | Japan ............ 483/31 |
| 2130931 | 6/1984 | United Kingdom . |

OTHER PUBLICATIONS

Japanese Patent Abstract No. 60167706(1)—Jan. 8, 1986.

*Primary Examiner*—William Briggs
*Attorney, Agent, or Firm*—Wood, Phillips, VanSanten, Clark & Mortimer

[57] ABSTRACT

A machine tool having a frame, a turret on the frame having a spindle for holding an operating tool, structure on at least one of the frame and turret for operating the spindle to effect machining of a workpiece by an operating tool held by the spindle, and first structure on at least one of the frame and turret for communicating fluid in a flow path from a pressurized supply to a workpiece to be machined by an operating tool held by the spindle to effect deburring/washing of the workpiece.

27 Claims, 5 Drawing Sheets

MACHINE TOOL WITH PARTS

BACKGROUND OF THE INVENTION

1. Field of the Invention

This invention relates to machine tools and, more particularly, to a machine tool that can be used selectively to operate standard tooling and as a parts deburrer/washer.

2. Background Art

Machine tools are currently available to perform a wide range of operations. The assignee herein currently offers a complete line of computerized numerically controlled (CNC) machines. These machines can be programmed to precisely machine components by causing different operating tools to operate in sequence upon a workpiece. Intricate parts may be produced with these machines which have deep bores, tight crevices, and other complex shapes which tend to capture removed material. Some parts may also contain burrs which, if not removed, could compromise the performance or quality of products manufactured with these parts. Still further, the parts may be subjected to a shower of lubricant or cooling fluid as the machining steps are performed.

Dedicated low pressure parts washing machines are currently offered for the purpose of removing burrs, chips and accumulated grease, lubricant and other type of fluid residue that might remain on parts after completion of the machining process. However, these low pressure washers, which operate at 70–100 psi, are generally effective in removing only some of the foreign matter from the parts and may not satisfactorily clean parts with complex shapes.

The assignee herein offers a line of dedicated high pressure water jet washing/deburring machines. These machines use a multi-stage system. A pump unit pressurizes water to be discharged against workpieces at 50–2000 kgf/$cm^2$(10–28,380 psi). The pressurized water is delivered through a variety of different deburring/washing nozzles, including nozzles which may be stationary or moving, nozzles which produce different spray patterns, and nozzles which are configured to spray exteriorally or penetrate bores and crevices in parts. The water is filtered upon delivery to the nozzles and is recovered, filtered and returned to the pump unit for recycling.

The assignee's systems have proven highly effective in terms of rapid deburring and washing of parts, including those with deep bores, complex shapes and cross holes. The washed parts generally can be processed to be completely free of detrimental burrs, foreign matter, and processing liquids and grease.

While the assignee's currently available machine tools and parts deburrers/washers are highly effective in performing the procedures to which they are dedicated, they together occupy a considerable amount of space in a facility. Purchase of dedicated machine tools and parts deburrers/washers also involves a significant expenditure. Further, it may be difficult to integrate the machine tools and parts deburrers/washers into a processing line within the constraints of a particular facility.

SUMMARY OF THE INVENTION

The present invention is specifically directed to overcoming the above enumerated problems in a novel and simple manner.

It is one objective of the present invention to integrate the machining and deburring/washing capabilities into a single machine tool, to thereby make possible a reduction in cost associated with purchasing equipment to perform both procedures and a reduction in space necessary to accommodate the machining and deburring/washing equipment.

In one form of the invention, a machine tool is provided having a frame, a turret on the frame having a spindle for holding an operating tool, structure on at least one of the frame and turret for operating the spindle to effect machining of a workpiece by an operating tool held by the spindle, and first structure on at least one of the frame and turret for communicating fluid in a flow path from a pressurized supply to a workpiece to be machined by an operating tool held by the spindle to effect deburring/washing of the workpiece.

The spindle includes a second structure for releasably holding an operating tool to facilitate changing thereof. The first structure has a fitting to be releasably held by the second structure, a nozzle for discharging pressurized fluid from the pressurized supply against a workpiece to be deburred/washed, and third structure cooperating between the fitting and nozzle for maintaining the nozzle in a predetermined position relative to the spindle with the fitting held by the second structure.

Accordingly, the turret spindle can be used to selectively operate a machine tool and to direct pressurized fluid through the nozzle against the workpiece to effect washing, deburring, etc. thereof.

In one form, the spindle is rotatable about an axis and the third structure causes the nozzle to rotate about the spindle axis with the fitting held by the spindle. This enhances the discharging flow pattern, which may be chosen depending upon the particular spray pattern produced by the nozzle.

The first structure may include a conduit and a housing in which the third structure is journalled for rotation. The third structure defines a passageway for communicating fluid continuously from the conduit to the nozzle as the nozzle rotates about the spindle axis.

To control the flow of pressurized fluid through the nozzle, a valve assembly can be provided. The valve assembly has an open state and a closed state. In the closed state, the valve assembly blocks communication of fluid from the pressurized supply through the fluid flow path to the nozzle outlet. In the open state, the valve permits fluid from a pressurized supply to flow through the fluid flow path to the nozzle outlet.

In one form, the valve assembly includes a housing and a valve member which is guided within the housing between open and closed positions. To operate the valve member, the valve member may include a pin projecting through the housing to be engaged by an actuator that is provided on at least one of the frame and turret. The valve member is biased towards one of its open and closed positions. The actuator has a cam surface which engages the pin and moves the pin against a force produced by the biasing means towards the other of its open and closed position as the turret is operated. In one form, the turret is rotatable relative to the frame and the actuator operates the valve assembly as an incident of the turret rotating about its axis.

To facilitate interchange of the deburring/washing structure and operating tools, a conduit may be provided to be releasably connected to the housing on the valve assembly. By disconnecting the conduit from the valve assembly and releasing the fitting from the spindle, the spindle can accept an operating tool.

In another form of the invention, the first structure includes a manifold on the frame with there being a second spindle on the turret, a second nozzle, and structure cooperating between the second spindle and second nozzle for holding the second nozzle in an operative position on the second spindle. The manifold has a flow passage for diverting fluid moving in the fluid flow path out of the fluid flow path to the second nozzle.

The user is thus afforded the flexibility of machining with one or both of the spindles or using one or both of the spindles to support parts deburring/washing elements.

Substantial versatility can be built into the machine tool by providing multiple, interchangeable nozzles, each having an outlet opening with a different configuration to produce different spray patterns.

In one form of the invention, the structure for producing a pressurized supply of fluid is incorporated into the frame. However, this structure could be separately built to operate in conjunction with the turret and spindle(s) which operate the machining tools.

In another form of the invention, a machine tool is provided having a frame and turret, with at least first and second spindles thereon. Structure is provided on the first spindle for holding an operating tool. Structure is provided on at least one of the frame and turret for operating the first spindle to effect machining of a workpiece by an operating tool held by the first spindle. A nozzle with an outlet is provided, with there being structure for connecting the nozzle to the second spindle. First structure is provided on at least one of the frame and turret for communicating fluid in a flow path from a pressurized supply into the nozzle and through the nozzle outlet against a workpiece to be deburring/washed.

In one form, the frame defines a workpiece operating station and there is structure cooperating between the turret and frame for moving the turret selectively between a first position wherein an operating tool on the first spindle can machine a workpiece at the operating station and a second position wherein fluid from a pressurized fluid supply can be directed through the nozzle against a workpiece at the operating station to effect deburring/washing thereof.

The invention further contemplates the combination of an operating tool having a first fitting, with the structure for holding the operating tool releasably holding the first fitting on the operating tool. The structure for connecting the nozzle to the second spindle may have a second fitting that is the same as the first fitting so that the second fitting can be releasably held in the first spindle.

The invention further contemplates a machine tool having a frame, a turret, structure on the turret for machining a workpiece and structure on at least one of the frame and turret for delivering fluid from a pressurized fluid supply against a workpiece to effect deburring/washing of the workpiece.

DETAILED DESCRIPTION OF THE DRAWINGS

Figure 1:
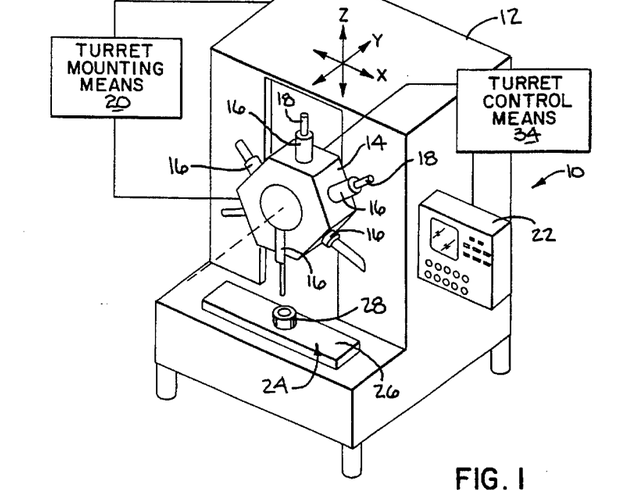
FIG. 1 is a schematic perspective view of a machine tool having incorporated therein the inventive structure for allowing both machining and deburring/washing of workpieces.
Figure 6:
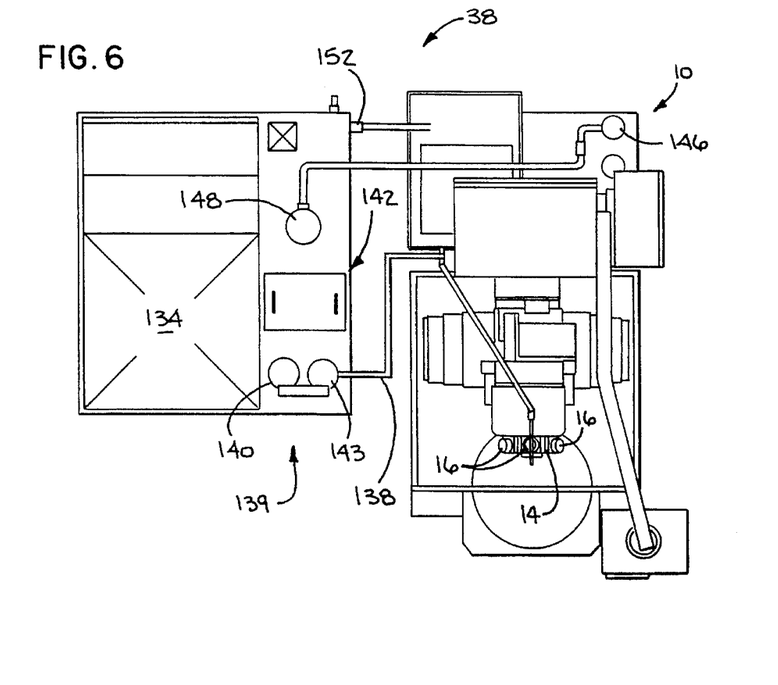
FIG. 6 is a plan view of the inventive machine tool.

In FIGS. 1 and 6, a machine tool, according to the present invention, is shown at 10. The machine tool 10 has a frame 12 to which a turret 14 is mounted. The turret 14 shown in the drawings is a six spindle turret. It should be understood that this turret configuration, and the permitted movement thereof relative to the frame 12, are intended to be only exemplary in nature. The inventive structure is operative with virtually an infinite number of different variations of machine tools. For example, the turret 14 shown has six different spindles 16 with individual operating tools 18 that are manually placed within, and removed from, the spindles 16. However, the invention would work equally well with a turret having more or less spindles 16 and an automatic tool changing capability.

The turret 14 is mounted by a means 20, shown schematically in FIG. 1, for translatory movement along X, Y and Z axes. The means 20 also mounts the turret 14 for rotation relative to the frame about the Y axis.

The machine functions may be pre-programmed and can be controlled and monitored through a control center 22.

The frame 12 defines a workpiece operating station 24 at which a stationary or movable table 26 supports a workpiece 28.

Figure 2:
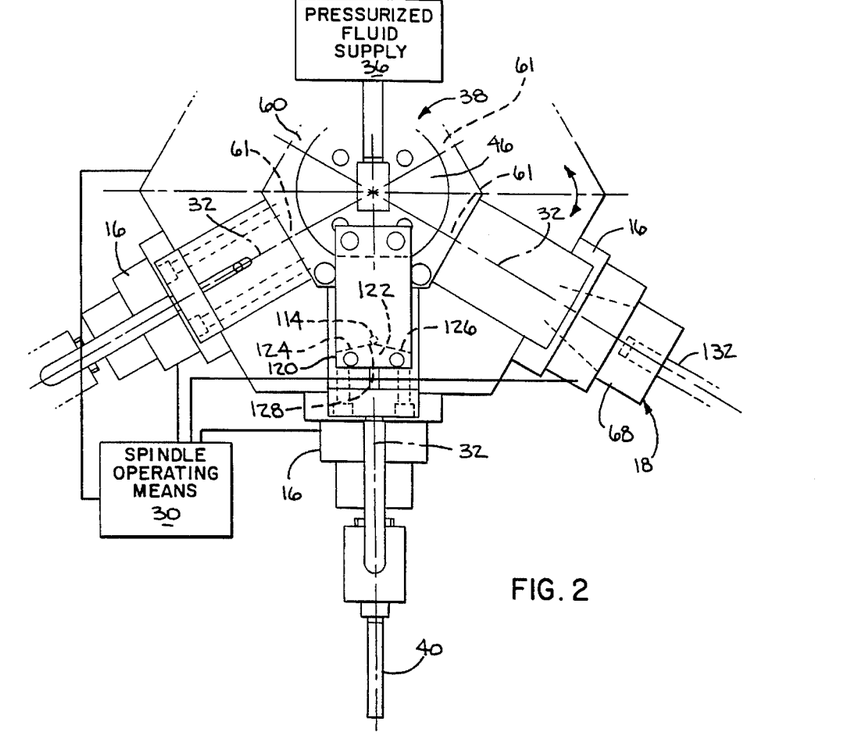
FIG. 2 is an enlarged, fragmentary, front elevation view of a six spindle turret on the machine tool in FIG. 1 with an operating tool on one spindle and structure on two other spindles for delivering fluid from a pressurized supply against a workpiece to be deburred/washed.

The individual spindles 16 are driven by an operating means, shown schematically in FIG. 2. The operating means 30 could cause all spindles 16 to be simultaneously rotated about their respective axes 32 or could cause only the spindle situated in the active position at the workpiece operating station 24 to operate.

Movement and operation of the turret 14 are controlled by a means 34, shown schematically in FIG. 1. The details of operation of a suitable turret control means 34 are well known to those skilled in the art. The turret control means 34 effects the desired X, Y and Z axis movement of the turret 14, indexing thereof about the Y axis, and the requisite operation of the spindles 16.

Figure 7:
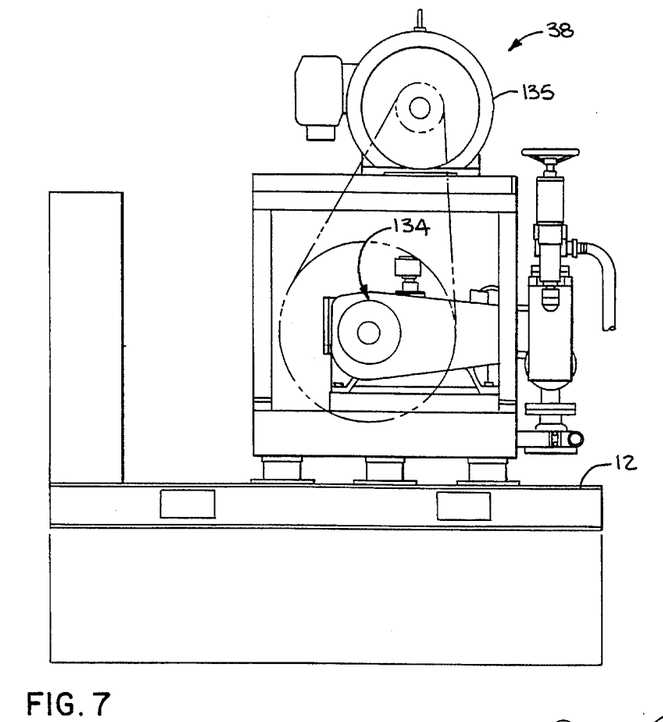
FIG. 7 is a side elevation view of structure on the inventive machine tool for pressurizing a fluid supply.
Figure 8:
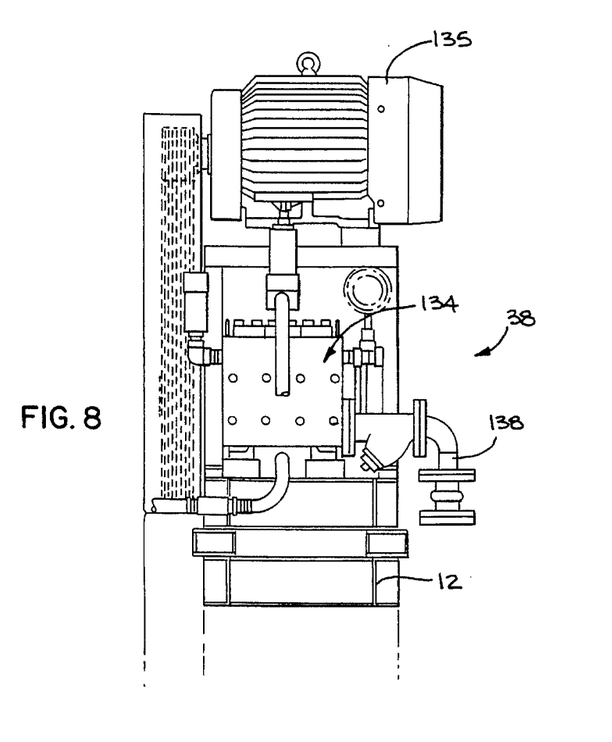
FIG. 8 is an end elevation view of the structure in FIG. 7.

The present invention is directed principally to structure for allowing the machine tool 10 to perform its normal machining functions and to permit parts deburring/washing utilizing the turret function. To accomplish this, the invention contemplates the delivery of fluid under pressure from a supply, shown schematically at 36 in FIGS. 2–5, against a workpiece 28. The means for pressurizing the fluid are shown schematically in FIG. 5 and in detail in FIGS. 6–8 and will be described in detail below.

As seen in FIGS. 2–5, the invention contemplates a means at 38 for communicating fluid in a flow path from the pressurized supply 36 to a discharge nozzle 40 having an outlet 42 from which fluid is expelled under pressure against the workpiece 28. It should be understood that the means 38 could be constructed on the frame 12 to be substantially independent of the turret 14. However, in a preferred form, the means 38 is integrated into the body 44 of the turret 14.

The means 38 includes a manifold 46 relative to which the turret 14 rotates. The manifold 46 is substantially disk-shaped and has a central axis 50 that is coincident with the rotational axis for the turret 14. The manifold 46 has a feed conduit 52 which branches off into individual flow paths 54, which are equal in number to the spindles 16 to effect delivery of pressurized fluid, if desired, to nozzles 40 associated with each of the spindles 16. A fluid inlet block 55 is in communication with the fluid supply 36 through a conduit 56 and is attached to the feed conduit 52 through a quick connect coupling 58.

The turret 14 carries a sealing ring 60 which has six flow passages 61 which are registrable, one each with the six flow paths 54 in the manifold 46, with the turret 14 positioned with each of the spindles 16 situated in an operating position.

Since the delivery of pressurized fluid from the supply 36 to a nozzle 40 on each spindle 16 is the same, one exemplary means 38 will be described. The fluid from the supply 36 communicates through the flow path 54 and flow passageway 61, through a valve assembly 62, a conduit 64, a housing 66, and to and through the nozzle 40.

Figure 3:
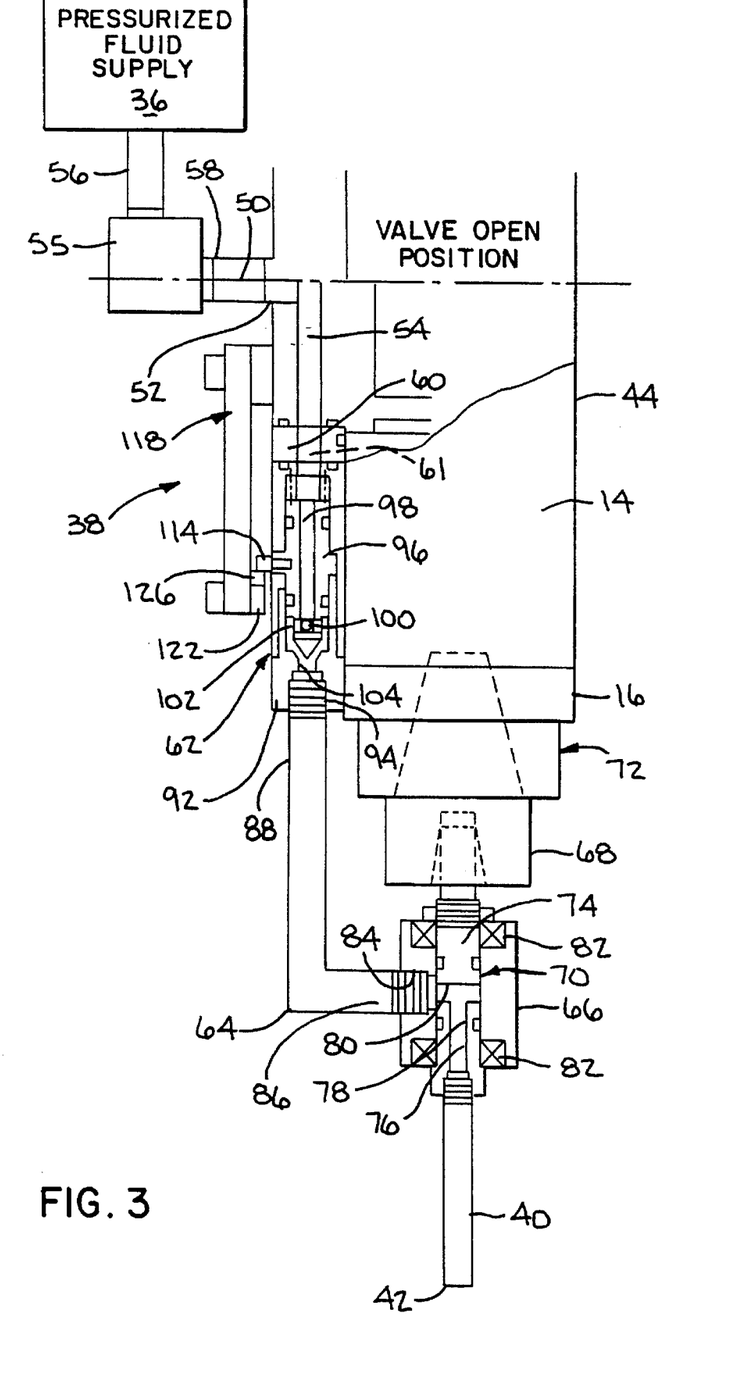
FIG. 3 is an enlarged, fragmentary, side elevation view of one of the spindles with structure for communicating fluid from a pressurized supply shown partially in cross section to show a valve thereon in an open position.
Figure 4:
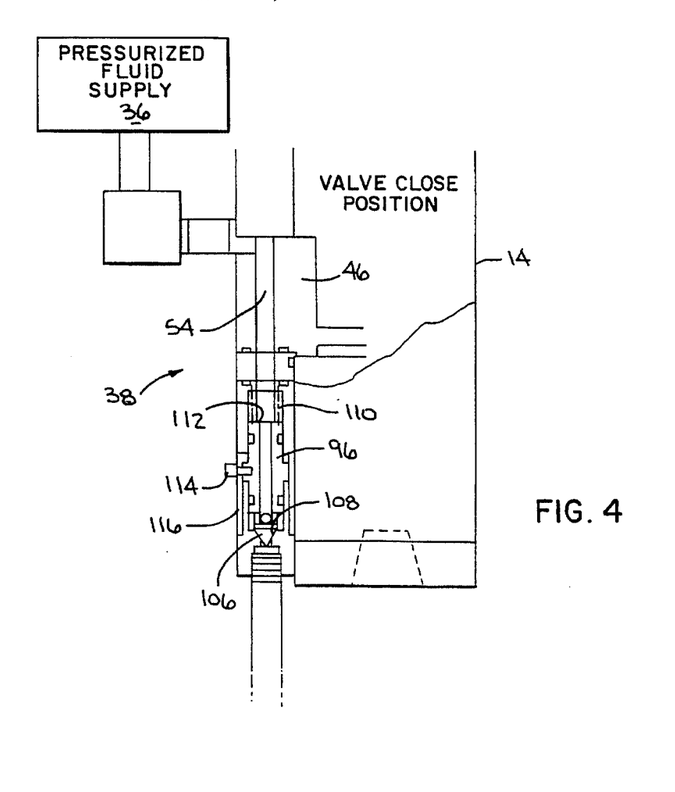
FIG. 4 is a view as in FIG. 3 with the valve in its closed position.
Figure 5:
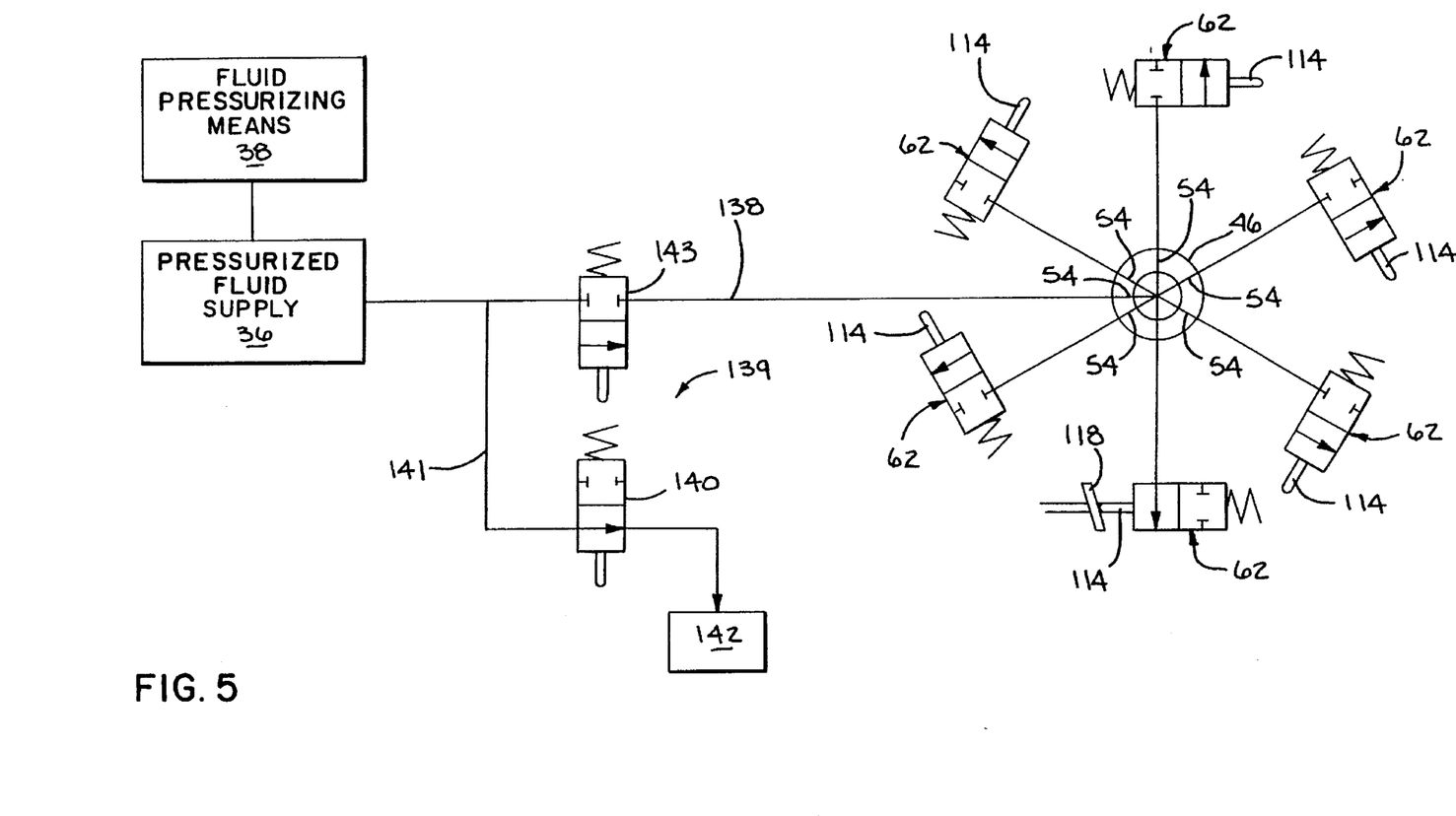
FIG. 5 is a schematic representation of the structure for delivering pressurized fluid from a supply for discharge against a workpiece according to the invention.

To maintain the nozzle 40 in a desired predetermined position relative to the spindle, a fitting/tool holder 68 is provided together with a means at 70, cooperating between the fitting/tool holder 68 and nozzle 40.

The fitting/tool holder 68 shown is designed for the assignee's machine tools. The spindle 16 has means 72 for releasably holding the fitting/tool holder 68 to allow facilitated interchange of operating tools.

The means 70 includes a shaft nozzle 74 defining a passageway 76 that is configured to maintain fluid communication between the conduit 64 and nozzle 40 as the nozzle 40 is rotated. The passageway 76 includes an axially extending portion 78 and a transverse portion 80, with the latter communicating directly with the conduit 64. The housing 66 has bearings 82 to guide movement of the shaft nozzle 74 therewithin.

The housing 66 defines a receptacle 84 for the downstream end 86 of the conduit 64. The upstream end 88 of the conduit 64 is releasably joined to a housing 92 on the valve assembly 62 through a conventional quick connect coupling 94.

The valve assembly 62 controls the communication of pressurized fluid from the supply 36 to the conduit 64. The valve assembly 62 is repositionable between open and closed states, as shown respectively in FIGS. 3 and 4.

The valve assembly 62 includes a cylindrical valve member 96 that is translatable guidingly within the housing between an open position, shown in FIG. 3, and a closed position shown in FIG. 4. In the open position, fluid is allowed to flow through an axial bore 98 in the valve member 96 and outwardly through at least one radial bore 100. Fluid discharging through the bore 100 flows into a chamber 102 and through a housing outlet 104.

In the closed position, a tapered nose 106 on the valve member 96 abuts flushly to a matched seat 108 surrounding the outlet 104 to prohibit flow of fluid through the valve member 96 to the conduit 64.

The valve member 96 is normally biased to the closed position by a spring 110 which bears between the housing 92 and an annular shoulder 112 on the valve member 96. To move the valve member 96 out of its closed position, a pin 114 is provided on the valve member 96. The pin 114 projects through a slot 116 in the housing 92 to be exposed externally of the housing 92.

With the means 38 in the fully assembled and operative position, the pin 114 is moved by an actuator 118. The actuator 118 has a rectangular, flat plate 120. The plate 120 has a cam member 122 thereon. The cam member 122 has oppositely inclined wall surfaces 124, 126, which cooperatively define a "V" shape opening away from the rotational axis of the turret 14. The plate 120 is attached to the manifold 46 so that the surfaces 124, 126 reside in the path of the pin 114 as the turret 14 is rotated about its axis.

The plate 120 is further positioned so that it will cause the nozzle 40 in a working position i.e. situated vertically downwardly at the operating station 24, to be activated. More particularly, as the turret 14 is rotated in either direction, the pin 114 on the spindle 16 to be activated contacts one of the surfaces 124, 126. Continued rotation of the turret 14 causes the surface 124, 126 which contacts the pin 14 to cam the pin 114 progressively upwardly to move the valve from its closed position to an open position. In the fully open position for the valve member 96, the pin 114 resides at the apex 128 of the cam member 122.

With the inventive structure, any combination of means 38 and operating tools 18 (FIG. 2) can be used on the spindles 16. The operating tool 18 shown has a fitting/tool holder 68 that is identical to that used to attach the nozzle 40. In this case, the fitting/tool holder 68 is shown to carry a conventional twist drill 182.

According to the invention, a machining operation can be performed on the workpiece 28, after which the turret 14 can be indexed to situate one of the operative nozzles 40 in the active position at the operating station 24.

The means 38 and operating tools 18 can be readily interchanged on the spindles 16. To disable the means 38 on any spindle 16, the coupling 94 and means 72 are released to separate the conduit 64 from the valve housing 92 and the fitting/tool holder 68 from the spindle 16. The conduit 64, housing 66 and nozzle 40 are separable as a unit. The operating tool 18 can then be substituted therefor. Similar, complete subassemblies consisting of the conduit 64, housing 66 and a desired nozzle 40 can be interchanged. As previously noted, nozzles 40 having different spray patterns are currently available and offered by the assignee hereof with its commercially available machine tools. Among these nozzles are fixed nozzles, articulated nozzles, direct-type nozzles, flat-type nozzles, lance nozzles, bullet nozzles, hose nozzles, etc.

With the above arrangement, an extremely versatile machine tool results. To make the unit compact, the fluid pressurizing means 38 is incorporated into the frame 12, although it should be understood that the invention contemplates a fluid pressurizing means 38 that is separate from the frame 12.

The details of the fluid pressurizing means 38 are shown in FIGS. 5–8. This precise fluid pressurizing means 38 is being sold commercially by the assignee hereof as its "high pressure water jet washing/deburring machine". Consequently, description of the details of the fluid pressurizing means 38 is unnecessary and omitted herefrom.

The means 38 has a jet pump 134 which is operable by a 30 horsepower motor 135 which produces a desired deburring pressure of 5,000 psi. It is preferred that the pressure be at least 3,000 psi for effective deburring of metal. The jet pump 134 communicates through a conduit 138 to the inlet block 55. A high pressure shifting valve 139 is provided to selectively control delivery of pressurized fluid from the supply 36. The shifting valve 139 includes a dump valve 140 for diverting pressurized fluid from the supply 36 through a bypass conduit 141 to a drain/tank 142. A supply valve 143 is provided between the supply 36 and conduit 138.

Fluid discharge from the nozzles 40 is recovered within the frame 12 and delivered by a filter pump 146 through a bag filter 148 from where the filtered fluid is delivered back to the tank 142 for recirculation. An overflow pipe 152 is provided on the tank 142.

The foregoing disclosure of specific embodiments is intended to be illustrative of the broad concepts comprehended by the invention.

We claim:

1. A machining and deburring system comprising:

a frame;

a supply of liquid;

means for pressurizing the supply of liquid to a pressure sufficient to effectively deburr a metal workpiece at which the pressurized liquid is propelled;

means on the frame for supporting a workpiece at an operating station;

means on the frame for machining a workpiece located at the operating station; and means on the frame for delivering liquid from the pressurized liquid supply at high pressure against a workpiece at the operating station to effect deburring thereof, wherein there is a turret on the frame and the means for delivering liquid includes a nozzle on the turret through which liquid from the pressurized liquid supply is delivered against a workpiece to be deburred.

2. A machining and deburring system comprising:

a frame;

a turret having first and second spindles each having means for holding an operating tool;

means for mounting the turret to the frame so that the turret can be indexed to selectively situate the first and second spindles in an active position to operate on a workpiece;

means on at least one of the frame and turret for operating one of the first and second spindles that is in the active position to effect machining of a workpiece by an operating tool held by the one of the first and second spindles that is in the active position;

means on the frame for pressurizing a supply of liquid to a pressure sufficient to effectively deburr a metal workpiece at which the pressurized liquid is propelled; and first means on at lest one of the frame and turret for communicating liquid in a flow path from the pressurized liquid supply against a workpiece to effect deburring of a workpiece, wherein at least one of the spindles includes second means for releasably holding an operating tool and the first means includes a fitting to be releasably held by the second means, a nozzle through which pressurized liquid from the supply is discharged against a workpiece to be deburred and third means cooperating between the fitting and nozzle for maintaining the nozzle in a predetermined position relative to the at least one spindle with the second means with the fitting held by the second means.

3. The machining and deburring system according to claim 2 wherein the means for operating the first and second spindles comprises means for rotating each of the first and second spindles about an axis and the third means comprises means to cause the nozzle to rotate about the axis of rotation of the at least one spindle as an incident of the fitting being rotated by the at least one spindle.

4. The machine and deburring system according to claim 3 wherein the first means includes a conduit, there further being a housing in which the third means is journalled for rotation, said third means defining a passageway for communicating pressurized liquid continuously from the conduit to the nozzle as the nozzle rotates about the axis of rotation of the at least one spindle.

5. The machine tool according to claim 1 wherein the means for pressurizing the supply of liquid comprises means for pressurizing the supply of liquid to at least 5000 psi, and there are means for connecting the means for pressurizing the supply of liquid to the frame.

6. The machining and deburring system according to claim 2 in combination with a metal workpiece and means for supporting the workpiece at an operating station, wherein the means for operating the one of the first and second spindles comprises means for operating the one of the first and second spindles to effect machining of the workpiece at the operating station, and the first means comprises means for communicating liquid from the pressurized supply at high pressure against the workpiece at the operating station.

7. A machine tool comprising:

a frame;

a turret on the frame having a spindle for holding an operating tool;

means on at least one of the frame and turret for operating the spindle to effect machining of a workpiece by an operating tool held by the spindle; and first means on at least one of the frame and turret for communicating fluid in a flow path from a pressurized supply to a workpiece to be machined by an operating tool held by the spindle to effect deburring/washing of a workpiece, wherein the first means includes a nozzle having an outlet through which fluid from a pressurized supply is delivered against a workpiece to be deburred/washed, the first means includes a valve assembly that has an open state and a closed state, said valve assembly in said closed state blocking communication of fluid from a pressurized supply through the fluid flow path to the nozzle outlet, said valve assembly in said open state permitting communication of fluid from a pressurized supply through the fluid flow path to the nozzle outlet, wherein there are means for mounting the turret to the frame for rotation about an axis relative to the frame, there further being an actuator on the frame and means cooperating between the actuator and valve assembly for moving the valve assembly from one of the open and closed states to the other of the open and closed states as an incident of the turret rotating about the turret axis.

8. A machine tool comprising:

a frame;

a turret on the frame having a spindle for holding an operating tool;

means on at least one of the frame and turret for operating the spindle to effect machining of a workpiece by an operating tool held by the spindle; and first means on at least one of the frame and turret for communicating fluid in a flow path from a pressurized supply to a workpiece to be machined by an operating tool held by the spindle to effect deburring/washing of a workpiece, wherein the first means includes a nozzle having an outlet through which fluid from a pressurized supply is delivered against a workpiece to be deburred/washed, the first means includes a valve assembly that has an open state and a closed state, said valve assembly in said closed state blocking communication of fluid from a pressurized supply through the fluid flow path to the nozzle outlet, said valve assembly in said open state permitting communication of fluid from a pressurized supply through the fluid flow path to the nozzle outlet, there being in combination with the machine tool a means for producing a pressurized supply of fluid, wherein the valve assembly comprises a housing and a valve member guided within the housing between open and closed positions, said valve member having a pin projecting through the housing to be engaged by the actuator, there being means for biasing the valve member towards one of its open and closed positions, wherein the means cooperating between the actuator and valve assembly comprises a cam surface on the actuator which engages the pin and moves the pin against a force produced by the biasing means towards the other of the open and closed positions as the turret is rotated about the turret axis.

9. The machining and deburring system according to claim 2 wherein the first means includes a conduit and a valve assembly that has an open state and a closed state, said valve assembly in said closed state blocking communication of liquid from the pressurized supply through the liquid flow path to and through the nozzle, said valve assembly in said open state permitting communication of liquid from the pressurized supply through the liquid flow path to and through the nozzle, said valve assembly including a housing, said first means further including a conduit communicating between the valve assembly and the nozzle, there being means for releasably connecting the conduit to the valve housing, whereby the conduit, third means and nozzle can be separated as a unit from the frame and turret by disconnecting the conduit from the valve housing and the fitting from the at least one spindle.

10. A machine tool comprising:

a frame;

a turret on the frame having a spindle for holding an operating tool;

means on at least one of the frame and turret for operating the spindle to effect machining of a workpiece by an operating tool held by the spindle: and first means on at least one of the frame and turret for communicating fluid in a flow path from a pressurized supply to a workpiece to be machined by an operating tool held by the spindle to effect deburring/washing of a workpiece, wherein the first means includes a manifold on the frame, there being a second spindle on the turret, a second nozzle, and means cooperating between the second spindle and second nozzle for holding the second nozzle in an operating position on the second spindle, said manifold defining a flow passage for diverting fluid moving in said fluid flow path out of said fluid flow path, there further being means for communicating fluid diverted out of the fluid flow path to the second nozzle.

11. The machine tool according to claim 10 wherein the first claimed and second nozzles each have an outlet opening and the configuration of the outlet openings on the first claimed and second nozzles are different.

12. A machining and deburring system comprising:

a frame;

a turret having at least first and second spindles;

means for mounting the turret to the frame;

means on the first spindle for holding an operating tool;

means on at least one of the frame and turret for operating the first spindle to effect machining of a workpiece by an operating tool held by the first spindle;

a nozzle having an outlet;

means for connecting the nozzle to the second spindle;

means for pressurizing a supply of liquid to a pressure sufficient to effectively deburr a metal workpiece at which the pressurized liquid is propelled; and first means on at least one of the frame and turret for communicating liquid in a flow path from the pressurized supply into the nozzle and through the nozzle outlet at high pressure against a workpiece to be deburred.

13. The machining and deburring system according to claim 12 wherein the frame defines a workpiece operating station and there are means cooperating between the turret and frame for moving the turret selectively between a first position wherein an operating tool on the first spindle can machine a workpiece at the operating station and a second position wherein liquid from the pressurized liquid supply can be directed through the nozzle against a workpiece at the operating station to effect deburring/washing thereof.

14. The machining and deburring system according to claim 12 wherein the means for pressurizing the supply of liquid comprises means for pressurizing the supply of liquid to at least 5000 psi.

15. The machining and deburring system according to claim 12 in combination with an operating tool having a first fitting and the means for holding an operating tool comprises means for releasably holding the first fitting on the operating tool.

16. The machining and deburring system according to claim 15 wherein the means for connecting the nozzle to the second spindle includes a second fitting that is the same as the first fitting, whereby the second fitting can be releasably held in the first spindle.

17. The machining and deburring system according to claim 12 wherein there are means on at least one of the frame and turret for rotating the second spindle about an axis and the means for connecting the nozzle to the second spindle connects the nozzle to the second spindle so that the nozzle rotates with the second spindle.

18. The machining and deburring system according to claim 17 wherein the first means comprises means for continuously communicating liquid into the nozzle and through the nozzle outlet as the nozzle is rotated by the second spindle.

19. The machining and deburring system according to claim 12 including means for effecting the multiple axes movement of the turret with pressurized liquid discharging through the nozzle to thereby cause pressurized liquid to discharge through the nozzle a) at selected distances from a workpiece, b) at different angles to a workpiece and c) at different locations on a workpiece.

20. The machining and deburring system according to claim 19 wherein the means for effecting multiple axis movement of the turret comprises means for effecting three axis movement of the turret.

21. The machining and deburring system according to claim 12 in combination with a supply of liquid, wherein the liquid is water.

22. The machining and deburring system according to claim 12 wherein the liquid in the pressurized supply is pressurized to at least 5,000 psi.

23. The machining and deburring system according to claim 12 wherein the means for pressurizing a supply of liquid comprises means for pressurizing a supply of liquid to on the order of 5,000 psi.

24. The machining and deburring system according to claim 2 wherein the means for pressurizing a supply of liquid comprises means for pressurizing a supply of liquid to at least 3,000 psi.

25. The machining and deburring system according to claim 12 wherein the means for pressurizing a supply of liquid comprises means for pressurizing a supply of liquid to at least 3,000 psi.

26. The machining and deburring system according to claim 1 wherein the means for pressurizing a supply of liquid comprises means for pressurizing a supply of liquid to at least 3,000 psi.

27. The machining and deburring system according to claim 26 wherein the means for pressurizing a supply of liquid comprises means for pressurizing a supply of liquid to on the order of 5,000 psi.

* * * * *

UNITED STATES PATENT AND TRADEMARK OFFICE
CERTIFICATE OF CORRECTION

PATENT NO.   : 5,535,496
DATED        : July 16, 1996
INVENTOR(S)  : Shigeru Sugino and Masanori Nakagawa It is certified that error appears in the above-indentified patent and that said Letters Patent is hereby corrected as shown below:

Title page, item [54] and col. 1, line 1,
The title of the invention should read:

"MACHINE TOOL WITH PARTS DEBURRER/WASHER"

Signed and Sealed this

Fourteenth Day of January, 1997

Attest:

BRUCE LEHMAN

*Attesting Officer*   *Commissioner of Patents and Trademarks*